United States Patent [19]
Tanaka et al.

[11] Patent Number: 6,020,927
[45] Date of Patent: Feb. 1, 2000

[54] VIDEO SIGNAL FORMAT CONVERTER

[75] Inventors: Kazuhito Tanaka, Otsu; Yutaka Nio, Osaka, both of Japan

[73] Assignee: Matsushita Electric Industrial Co., Ltd., Osaka, Japan

[21] Appl. No.: 09/095,615

[22] Filed: Jun. 10, 1998

[30] Foreign Application Priority Data

Jun. 19, 1997 [JP] Japan ................................ 9-162257

[51] Int. Cl.⁷ ...................................... H04N 7/01
[52] U.S. Cl. ............................................ 348/458; 348/536
[58] Field of Search .................................. 348/443, 458, 348/448, 441, 536, 540, 554, 555, 556, 558

[56] References Cited

U.S. PATENT DOCUMENTS

| | | | |
|---|---|---|---|
| 4,658,284 | 4/1987 | Kawamura et al. ............ | 348/458 |
| 5,159,437 | 10/1992 | Lee ................................. | 348/443 |
| 5,194,937 | 3/1993 | Lee et al. ........................ | 348/458 |
| 5,229,853 | 7/1993 | Myers ............................. | 348/443 |
| 5,237,396 | 8/1993 | Kayashima et al. ............ | 348/448 |
| 5,274,447 | 12/1993 | Nakagaki et al. .............. | 348/443 |

FOREIGN PATENT DOCUMENTS 7-123372   5/1995   Japan .

*Primary Examiner*—Victor R. Kostak
*Attorney, Agent, or Firm*—Ratner & Prestia

[57] ABSTRACT

A video signal converter converts a first video signal into a second video signal by changing the number of scanning lines. A horizontal pulse synchronized with the first video signal is fed into a PLL circuit, which generates a first clock signal synchronized with the horizontal pulse. The first video signal undergoes A/D conversion by sampling with the first clock signal. The converter receives a first digital video signal which has undergone the A/D conversion, the first clock signal, the horizontal pulse, and a vertical pulse synchronized with the first video signal, and thus changes a number of scanning lines of the first video signal. The converter, next, writes a second digital video signal into a memory by synchronizing the first clock signal. Then, the second digital video signal is read out from the memory by synchronizing a second clock signal generated from another clock signal generator, and is outputted as a third digital video signal, which is converted by a D/A converter into a second video signal having a desirable number of scanning lines and being outputted without video distortion in the horizontal direction.

13 Claims, 16 Drawing Sheets

VIDEO SIGNAL FORMAT CONVERTER

FIELD OF THE INVENTION

The present invention relates to a video signal converter which converts a first number of scanning lines into a second number of scanning lines.

BACKGROUND OF THE INVENTION

The introduction of HDTV (high definition television) receivers has been accompanied by requests for recording of HDTV videos for use by a present video cassette recorders. At the same time, it has been desirable to maintain high resolution, one of features of the HDTV. In response to multi-image processing, it is anticipated that demand will be boosted for recording videos by various broadcasting systems, such as present NTSC-encoded, etc., Hi-Vision, and a digital broadcasting system simultaneously in high resolution format. In order to realize these functions, for instance, when a Hi-Vision signal must be converted into a NTSC-encoded signal, the Hi-Vision signal transmitted on a MUSE (Multiple sub-Nyquist Sampling Encoding system) signal must be converted into the NTSC-encoded signal.

A conventional scanning-line-converter comprises a MUSE-NTSC converting circuit as described in the unexamined Japanese Patent Application publication No. H07-123372. The conventional converter employing the MUSE-NTSC converting circuit is described here by referring to FIG. 16, which is a block diagram depicting a conventional video signal converter.

An operation of an A/D (Analog to Digital) converter 200 is described as follows: A MUSE input signal converted from analog to digital by the A/D converter 200 is fed into a MUSE input process circuit 201 as well as a MUSE synchronous signal (hereinafter called "sync signal") generating circuit 202. Based on a MUSE sync signal tapped off from the MUSE sync signal generating circuit 202, a MUSE timing signal generating circuit 203 taps off a MUSE timing signal. Based on the MUSE sync signal and the MUSE timing signal, a MUSE input process circuit 201 taps off a digital video signal which has undergone an input process. The digital video signal is written into a MUSE-NTSC converting RAM 205. A NTSC timing signal generating circuit 207 receives a NTSC-encoded clock signal tapped off from a NTSC clock signal generating circuit 208, and produces a NTSC-encoded timing signal. A NTSC-encoded MUSE signal is read out from the MUSE-NTSC converting RAM 205 using the NTSC-encoded timing signal, and fed into a MUSE summary decoding circuit 206. A video signal, which is decoded into a NTSC signal tapped off from the MUSE summary decoding circuit 206, is fed into an output process circuit 209, whereby a NTSC output signal is obtained. The NTSC-encoded timing signal generating circuit 207 produces a sync signal for the NTSC output signal.

According to the above operation, however the MUSE summary decoding circuit exclusively used for NTSC conversion is used for the conversion from MUSE signal to NTSC signal. Because of a simplified circuit in the MUSE summary decoding circuit, the NTSC-encoded output signal by the summary MUSE decoding circuit shows a deteriorated video both in horizontal and vertical directions compared with that shown by HDTV base band output signal obtained by decoding a MUSE signal correctly.

When both of the HDTV base band output signal and the NTSC output signal can be obtained simultaneously in response to the MUSE input signal, the summary MUSE decoding circuit is used in addition to a decoding circuit of the MUSE signal. Therefore, the above operation uses a complicated as well as a large-sized circuit.

SUMMARY OF THE INVENTION

In a video signal converter which converts a number of scanning lines of a first video signal into a number of scanning lines of a second video signal, the video signal converter according to the present invention comprises the following elements:

(a) a PLL (phase-locked loop) circuit which receives a horizontal pulse synchronized with a first input video signal, and generates a first clock signal synchronized with the horizontal pulse, (b) an A/D converter which converts the first input video signal using the first clock signal, (c) a video converting circuit which receives (1) a first digital video signal tapped off from the A/D converter, (2) the first clock signal, (3) the horizontal pulse and (4) a vertical pulse synchronized with the first video signal, and converts a number of scanning lines of the first digital video signal, (d) a clock signal generator which outputs a second clock signal independent of the first clock signal, (e) a memory which stores a second digital video signal tapped off from the video converting circuit using the first clock signal from the PLL circuit, and reads out the second digital video signal using the second clock signal from the clock signal generator before tapping it off as a third digital video signal, and (f) a D/A converter which converts a third digital video signal tapped off from the memory into analog format from digital, whereby the number of scanning lines of the inputted first video signal is converted, and then the second video signal is outputted.

The entire operation according to the above structure can be described as follows:

(1) a horizontal pulse synchronized with a first video signal is inputted, (2) a first clock signal synchronized with the horizontal pulse is generated, (3) the first video signal is converted from an analog form into a digital form using the first clock signal, (4) a number of scanning lines of the video signal is converted by using the digital video signal undergone the A/D conversion, the first clock signal, the horizontal pulse and a vertical pulse as input signals, (5) the video signal synchronized with the first clock signal is stored into a memory, (6) the video signal is read out by using the second clock signal generated by another clock signal generator, (7) an output from the memory is converted into an analog form from a digital form using the second clock signal, (8) finally a second video signal having a desirable number of scanning lines is outputted regardless of the number of scanning lines of the inputted first video signal.

As described above, according to the present invention, the number of scanning lines of the first video signal can be converted to a desirable number of scanning lines of the second video signal without video deterioration in horizontal direction. Further, a simpler circuit than the summary MUSE decoding circuit can realize the conversion from the MUSE signal into the NTSC signal, which proves that the present invention can provide a practical advantage.

DETAILED DESCRIPTION OF PREFERRED EMBODIMENTS

Figure 1:
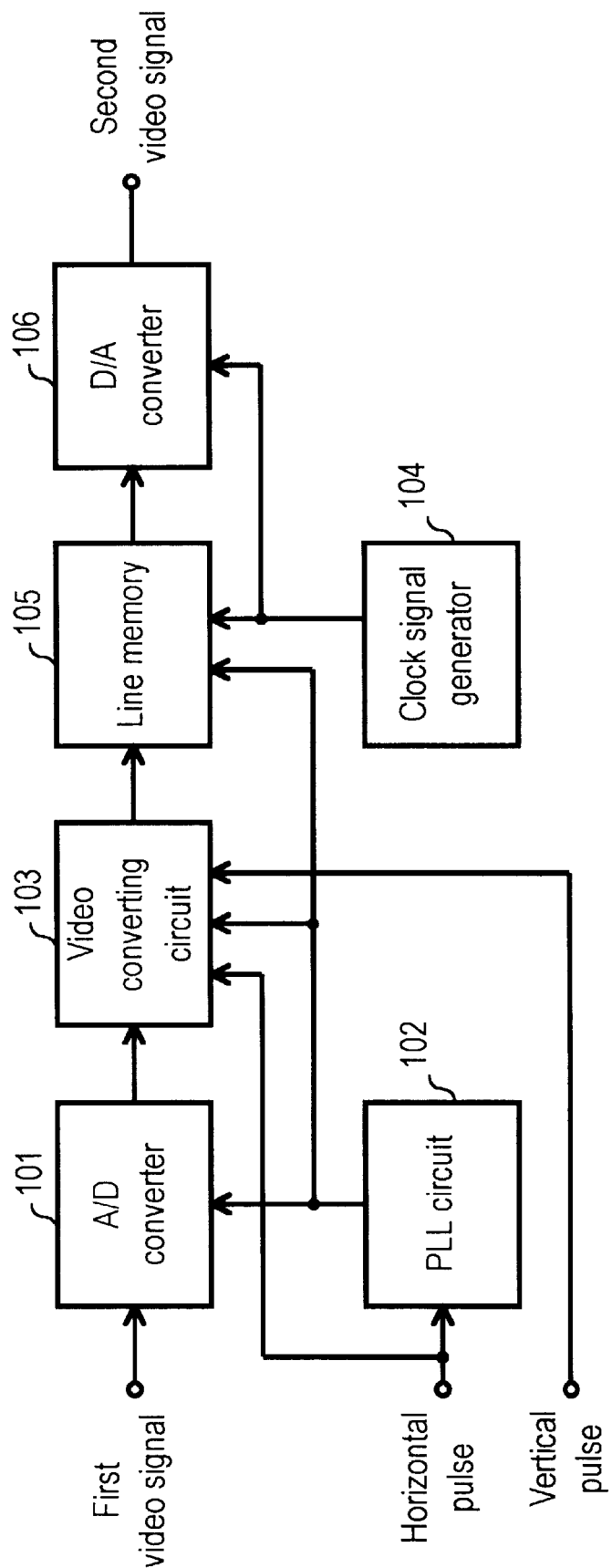
FIG. 1 is a block diagram depicting a video signal converter in accordance with a first exemplary embodiment of the present invention.

The embodiments of the present invention are detailed hereinafter by referring to the drawings.

(Embodiment 1)

In FIG. 1, a video signal converter used in the first exemplary embodiment of the present invention comprises the following elements:

(a) an A/D converter 101 which converts a first video signal into a digital form from an analog form, and then taps off a first digital video signal, (b) a PLL circuit 102 which receives a horizontal pulse synchronized with the first video signal, and then generates a first clock signal synchronized with the horizontal pulse, (c) a video converting circuit 103 which receives the first digital video signal, the first clock signal, the horizontal pulse and a vertical pulse synchronized with the first video signal, and then changes the number of the scanning lines of the first digital video signal. The changed first digital video signal is called a second digital video signal.

(d) a clock signal generator 104 generating a second clock signal of which frequency differs from that of the first clock signal tapped off from the PLL circuit 102, (e) a line memory 105 which receives the first and second clock signals, stores a second digital video signal tapped off from the video converting circuit 103 by using the first clock signal, and then reads out the second digital video signal using the second clock signal before tapping it off as a third digital video signal, (f) a D/A converter 106 which converts the inputted third digital video signal into an analog form from a digital form using the second clock signal, and then taps it off as a second video signal.

The operation of the video signal converter having the above structure is described as follows:

(1) The PLL circuit 102 receives the horizontal pulse synchronized with the first video signal, and feeds the first clock signal synchronized with the horizontal pulse into the A/D converter 101, (2) the A/D converter 101 converts the first video signal by sampling the inputted first video signal with the first clock signal, (3) the video converting circuit 103 changes a number of scanning lines by interpolating the scanning lines of the first digital video signal tapped off from the A/D converter 101, and (4) the line memory 105 stores the second digital video signal of which scanning lines have been interpolated, which is tapped off from the video converting circuit 103, by using the first clock signal tapped off from the PLL circuit 102. The second digital video signal is read out with the second clock signal tapped off from the clock signal generator 104 before being fed into the D/A converter 106. The read-out signal is called a third digital video signal. Meanwhile, the second clock signal is independent of the first clock signal.

In the above operation, the frequencies of the first and second clock signals are selected so that a number of samples per scanning line of the first video signal equals that of the second video signal. A horizontal frequency of the second digital video signal is identified by a number of samples per scanning line of the first video signal and a frequency of the second clock signal.

In the above structure, the base band HDTV signal for instance, which has undergone a decoding process of the MUSE signal, is inputted as the first video signal, and then the scanning lines of the HDTV signal are interpolated to be the NTSC signal, whereby the HDTV signal is converted into the NTSC signal. The above structure has two advantages compared with the conventional MUSE summary decoding circuit, i.e. (1) it has simpler circuitry, and (2) since the number of scanning lines is converted by interpolation only(i.e), the video is not deteriorated in the horizontal direction.

Figure 15:
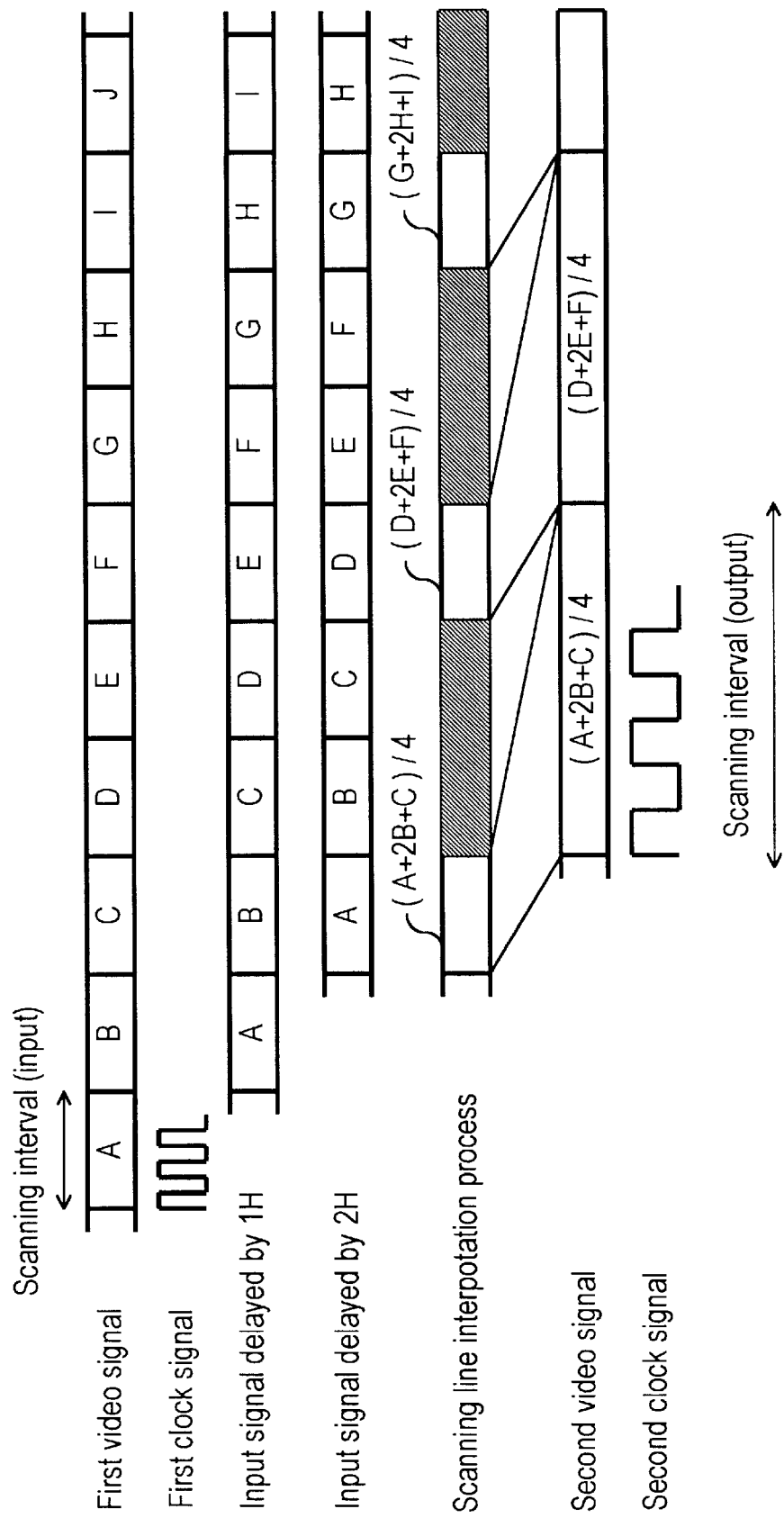
FIG. 15 is an operational timing chart of a video signal converter in accordance with an exemplary embodiment of the present invention.
Figure 16:
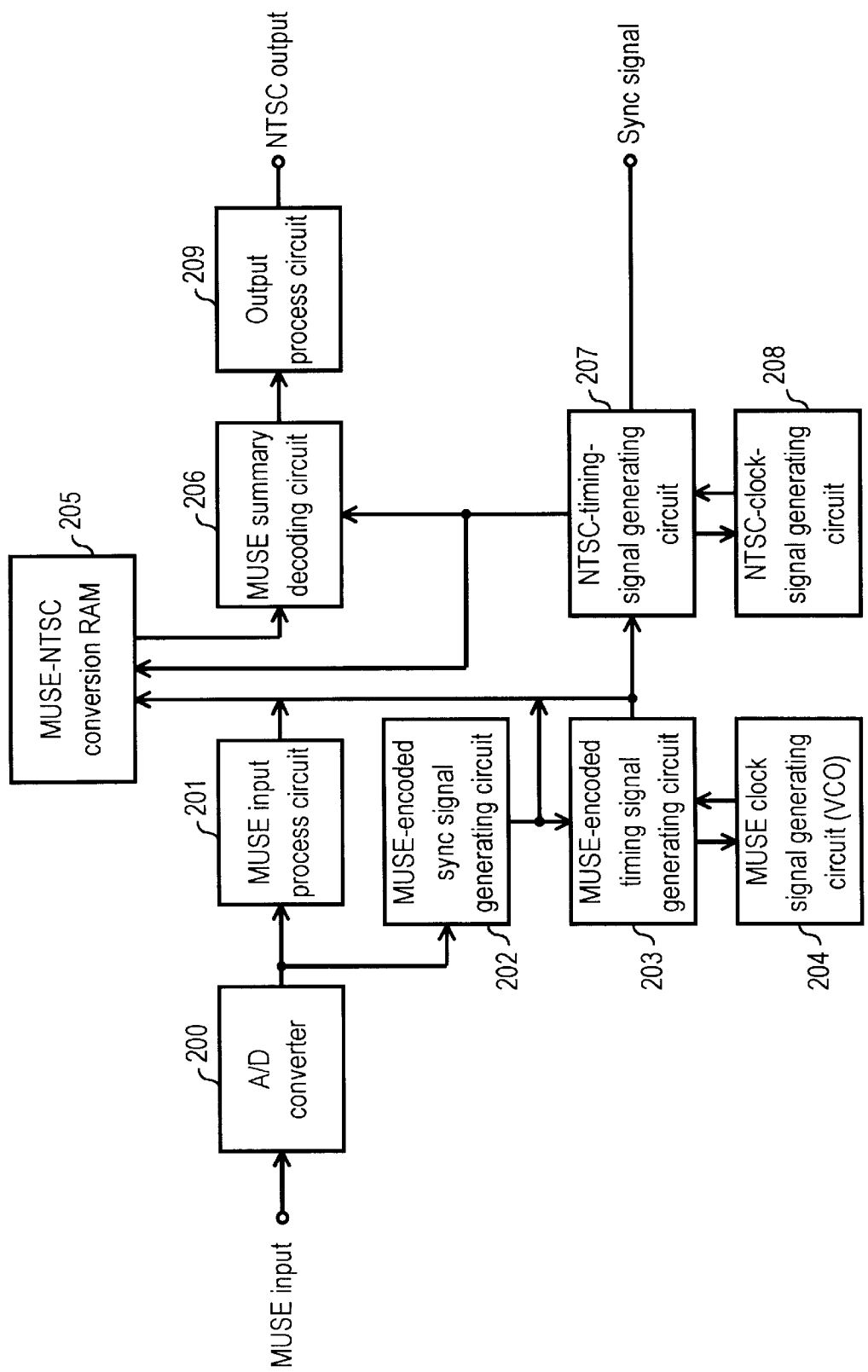
FIG. 16 is a block diagram of a conventional video signal converter.

FIG. 15 depicts a timing chart where three scanning lines are reduced to one scanning line. The interpolation of the scanning lines in this case is conducted as follows: A center scanning line of interpolating scanning lines is weighted ½, the upper and lower scanning lines of the center scanning line are weighted ¼, then the first video signal synchronized with the first clock signal is read out by being synchronized with the second clock signal, and the number of read-out scanning lines is reduced to ⅓ that of the originally inputted video signal.

(Embodiment 2)

Figure 2:
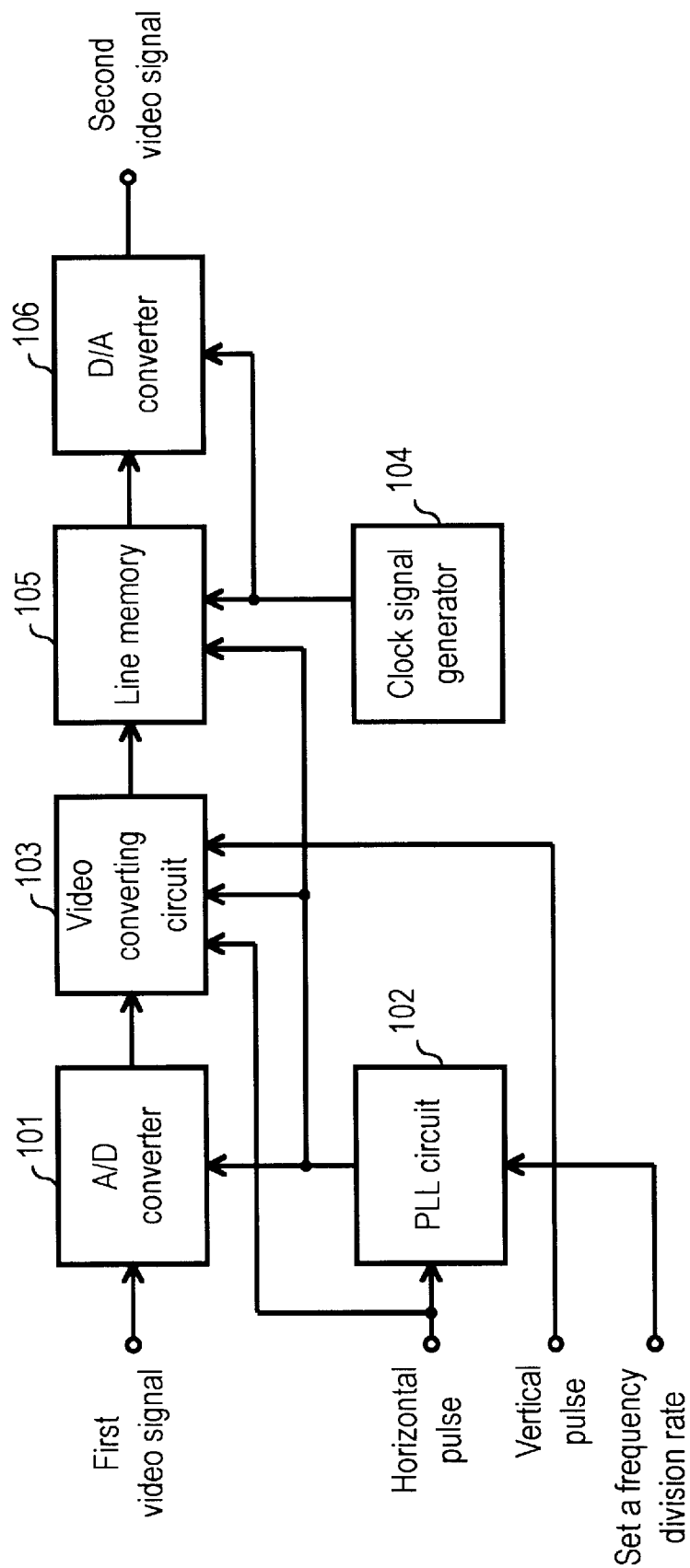
FIG. 2 is a block diagram depicting a video signal converter in accordance with a second exemplary embodiment of the present invention.

The second exemplary embodiment is described hereinafter by referring to FIG. 2, which differs from FIG. 1 in setting a frequency division rate in the PLL circuit 102. The other elements are the same as shown in FIG. 1.

This circuitry enables the PLL circuit 102 to determine the frequency division rate so that the following condition is fulfilled: a number of effective pixels per one scanning line of the second video signal using the second clock signal tapped off from the clock signal generator 104 equals that of the first video signal using the first clock signal tapped off from the PLL circuit 102.

When producing a "N" number of scanning lines of the second video signal from a "M" number of scanning lines of the first video signal (M>N), an adjusting of the frequency division rate of the PLL circuit 102 can equalize the two required times for the line memory operation, i.e. one is a required time for writing the "M" scanning lines of the first video signal into the line memory 105, and the other one is a required time for reading out the "N" scanning lines of the second video signal from the line memory 105. It also allows to determine a minimum required capacity of the line memory 105 so that the read out time should not exceed the write-in time within the above two required times.

(Embodiment 3)

Figure 3:
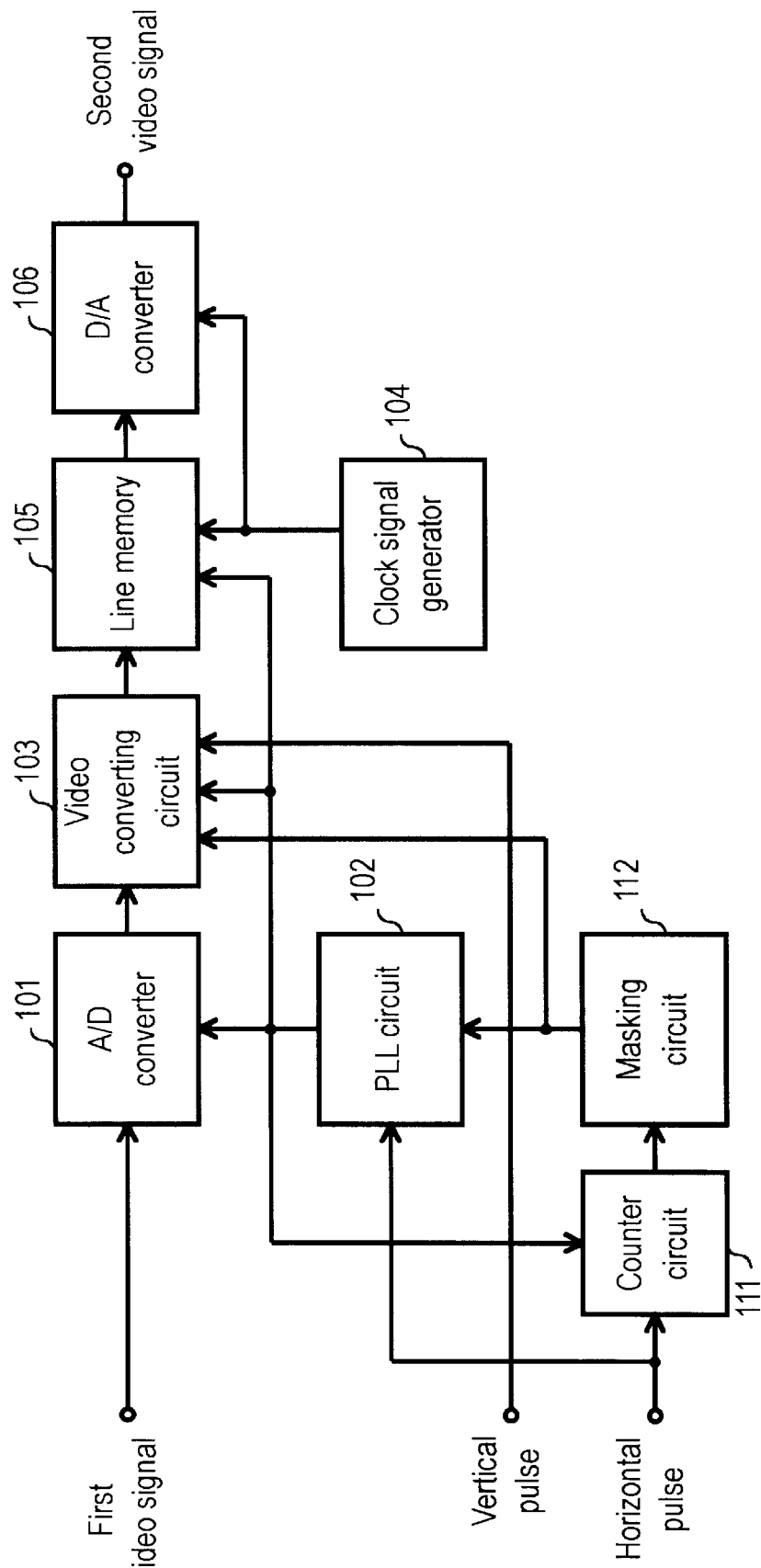
FIG. 3 is a block diagram depicting a video signal converter in accordance with a third exemplary embodiment of the present invention.

The third exemplary embodiment is described hereinafter by referring to FIG. 3, which differs from FIG. 1 in the following point: A masking circuit 112 provides a masking process in a desirable interval within a horizontal scanning line of the PLL circuit 102 using a counter circuit 111. The counter circuit 111 is triggered by the first clock signal, and uses a horizontal pulse as a reset signal.

The other elements are the same as shown in FIG. 1.

This circuitry can stabilize an operation of the PLL circuit 102, by providing predetermined periods of the horizontal pulse with the masking process, thereby eliminating signals such as an equalizing pulse of the NTSC signal, etc. As a result, a more stable operation of the PLL circuit 102 than that in the first exemplary embodiment can be obtained.

(Embodiment 4)

Figure 4:
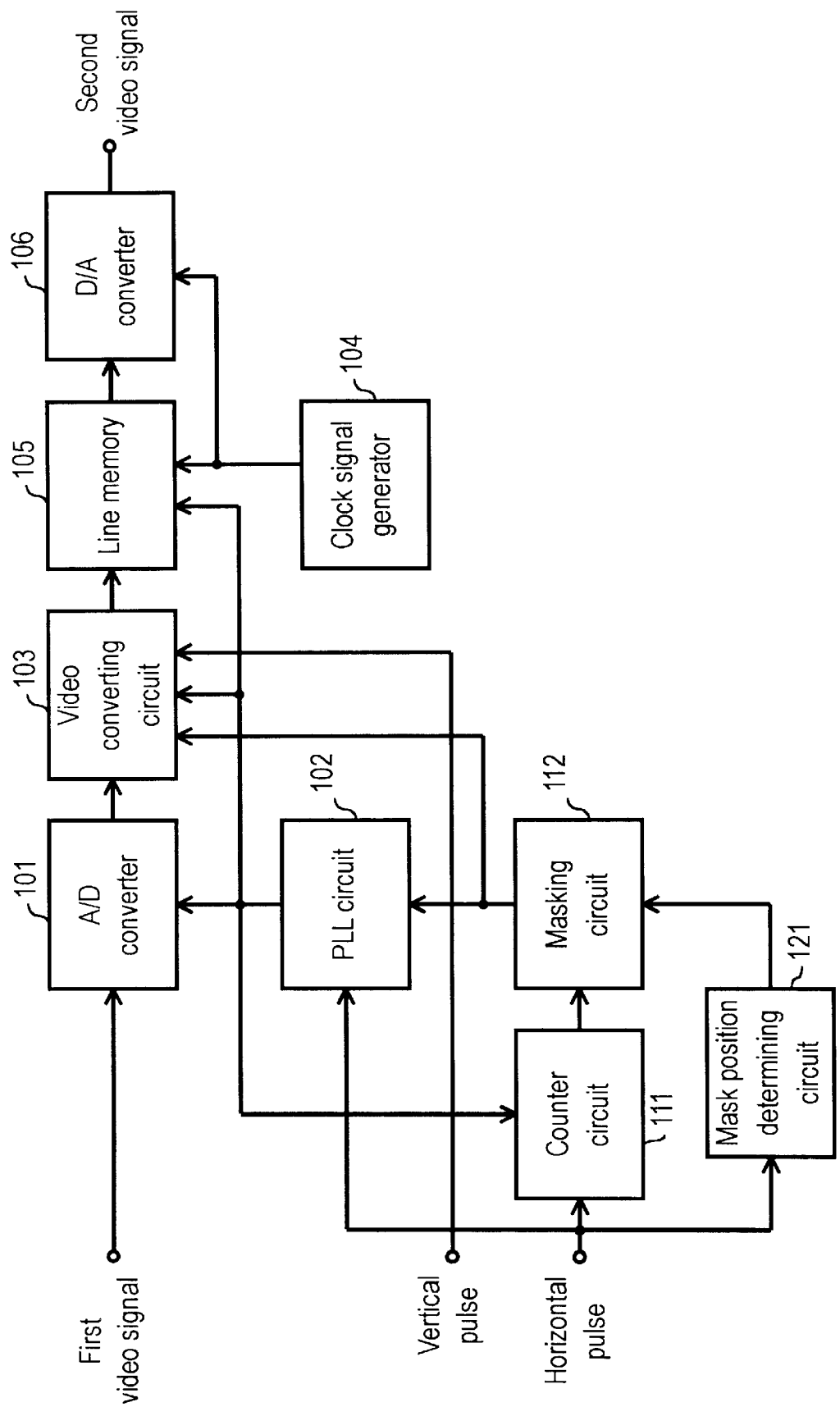
FIG. 4 is a block diagram depicting a video signal converter in accordance with a fourth exemplary embodiment of the present invention.

The fourth exemplary embodiment is described hereinafter by referring to FIG. 4, which differs from FIG. 3 in the following point: A mask position determining circuit 121 can determine a starting position of the masking process by using the horizontal pulse, and an output from the counter circuit 111 can determine an ending position of the masking process. The other elements are the same as shown in FIG. 3.

When the starting position of the masking process is near the horizontal pulse, this circuitry allows the masking process to be free from errors such as masking the first clock signal, and a masking process period to be determined with more accuracy than that in Embodiment 3.

(Embodiment 5)

Figure 5:
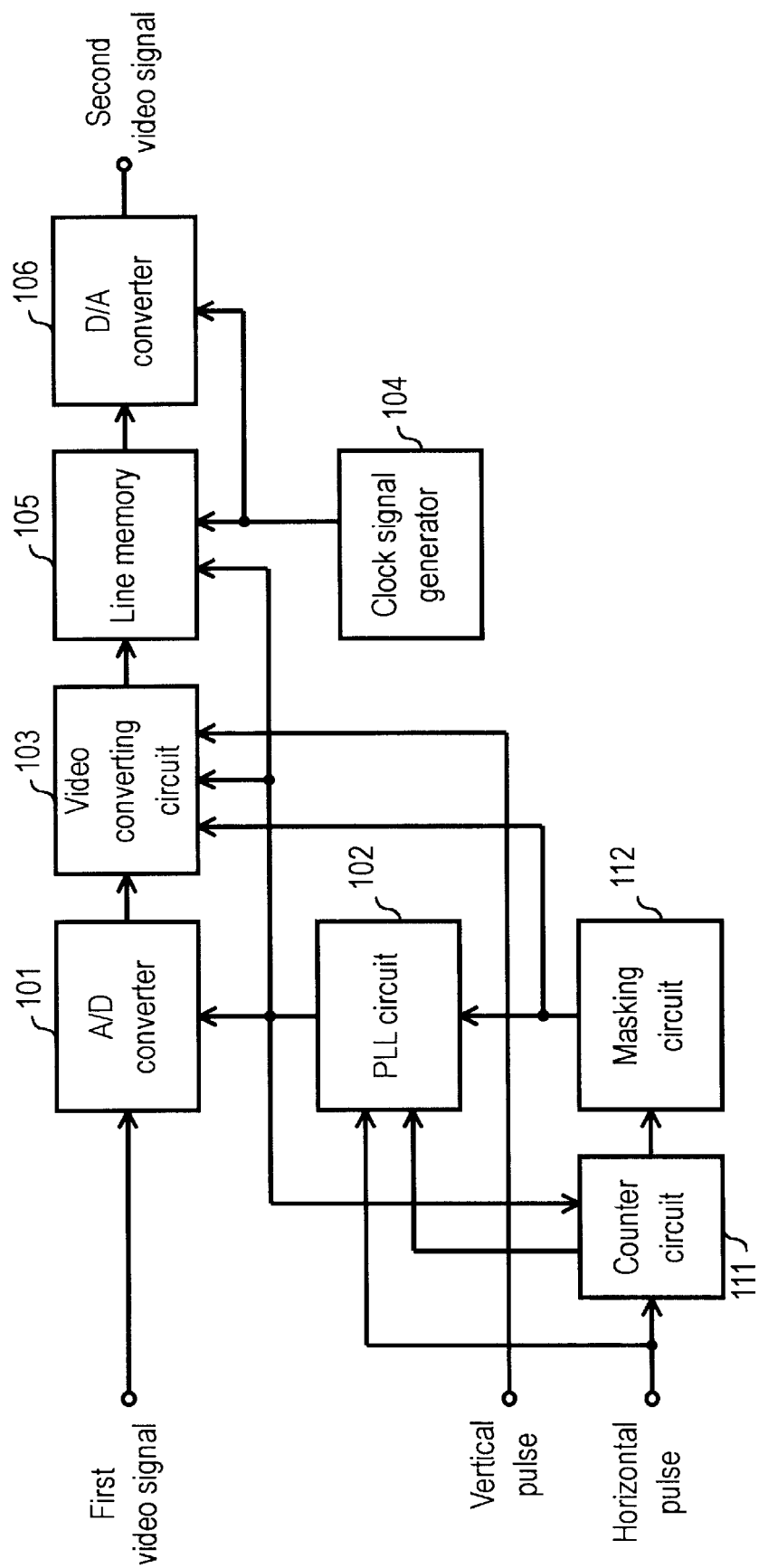
FIG. 5 is a block diagram depicting a video signal converter in accordance with a fifth exemplary embodiment of the present invention.

The fifth exemplary embodiment is described hereinafter by referring to FIG. 5, which differs from FIG. 1 in the following point: The counter circuit 111 measures a horizontal frequency, and compares the measured frequency with a predetermined threshold frequency, thereby identifying a horizontal frequency of the first video signal. The operation of the PLL circuit 102 can be appropriately controlled by this identified result. The other elements are the same as shown in FIG. 1.

This circuitry allows the frequency of the horizontal pulse to control the frequency division rate of the PLL circuit 102, thereby adjusting the frequency of the first clock signal depending on the type of the first video signal. This structure also allows the frequency of the horizontal pulse to control characteristics of a phase comparison filter used in the PLL circuit 102, thereby improving the performance of the PLL circuit 102 from that in the first exemplary embodiment.

(Embodiment 6)

Figure 6:
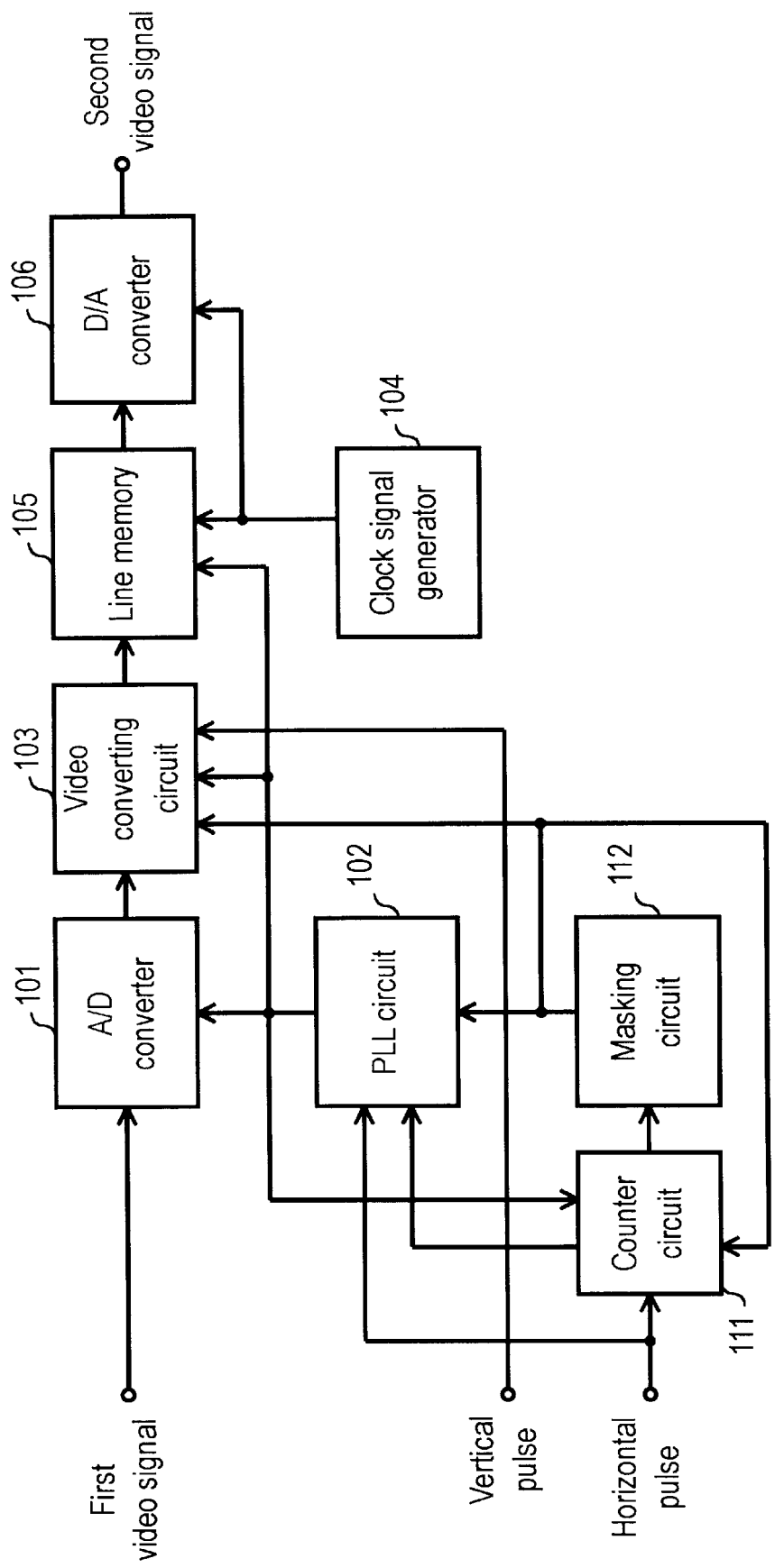
FIG. 6 is a block diagram depicting a video signal converter in accordance with a sixth exemplary embodiment of the present invention.

The sixth exemplary embodiment is described hereinafter by referring to FIG. 6, which differs from FIG. 3 in the following point: the counter circuit 111 operating by being synchronized with a second horizontal pulse, which underwent the masking process in the masking circuit 112, can identify the horizontal frequency, thereby controlling appropriately the operation of the PLL circuit 102. The other elements are the same as shown in FIG. 3.

This circuitry allows the horizontal frequency of the second horizontal pulse stabilized by the masking process to control the operation of the PLL circuit 102, whereby the PLL circuit can be controlled with more accuracy than that in the third exemplary embodiment.

(Embodiment 7)

Figure 7:
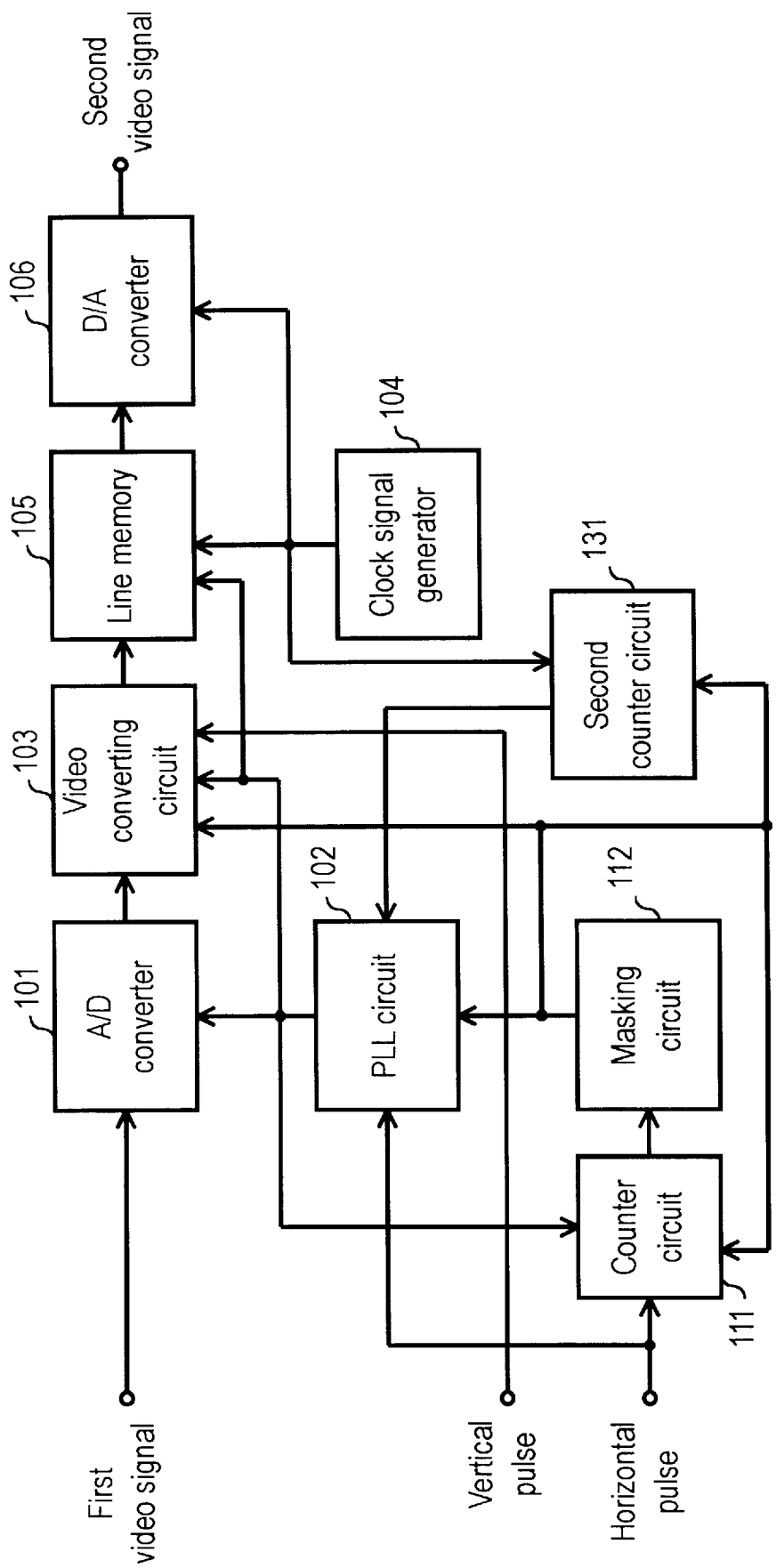
FIG. 7 is a block diagram depicting a video signal converter in accordance with a seventh exemplary embodiment of the present invention.

The seventh exemplary embodiment is described hereinafter by referring to FIG. 7, which differs from FIG. 3 in the following point: a second counter circuit 131 triggered by the second clock signal identifies the horizontal frequency of the first video signal, thereby controlling appropriately the operation of the PLL circuit 102. The other elements are the same as shown in FIG. 3.

This circuitry allows the horizontal frequency of the second horizontal pulse, which is stabilized by the masking process, to control the operation of the PLL, circuit 102, whereby the PLL circuit 102 can be controlled with more accuracy than that in the third exemplary embodiment. This structure also allows the second clock signal, which differs from the first clock signal, to trigger the counter circuit 131, whereby the horizontal frequency of the first video signal can be measured with more accuracy than that in the sixth exemplary embodiment, even if the PLL circuit 102 is not locked in a desirable status.

(Embodiment 8)

Figure 8:
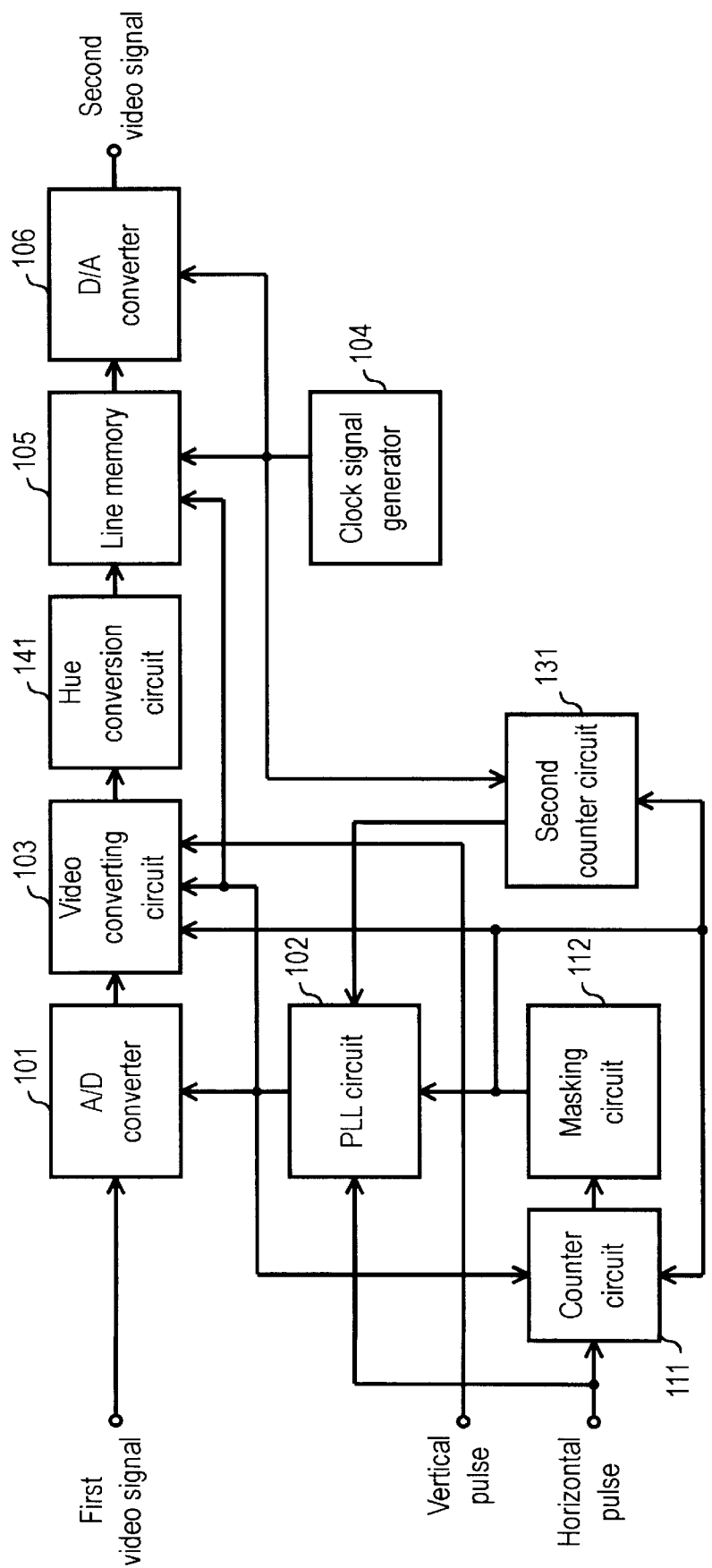
FIG. 8 is a block diagram depicting a video signal converter in accordance with an eighth exemplary embodiment of the present invention.

The eighth exemplary embodiment is described hereinafter by referring to FIG. 8, which differs from FIG. 7 in the following point: after converting a number of scanning lines by the video converting circuit 103, a hue conversion circuit 141 converts a hue of the video signal. The other elements are the same as shown in FIG. 7.

This circuitry can realize, e.g. a conversion of a hue of HDTV into a hue of NTSC signal when the MUSE signal is converted into the NTSC signal. This is an advantage of this embodiment over the seventh exemplary embodiment.

(Embodiment 9)

Figure 9:
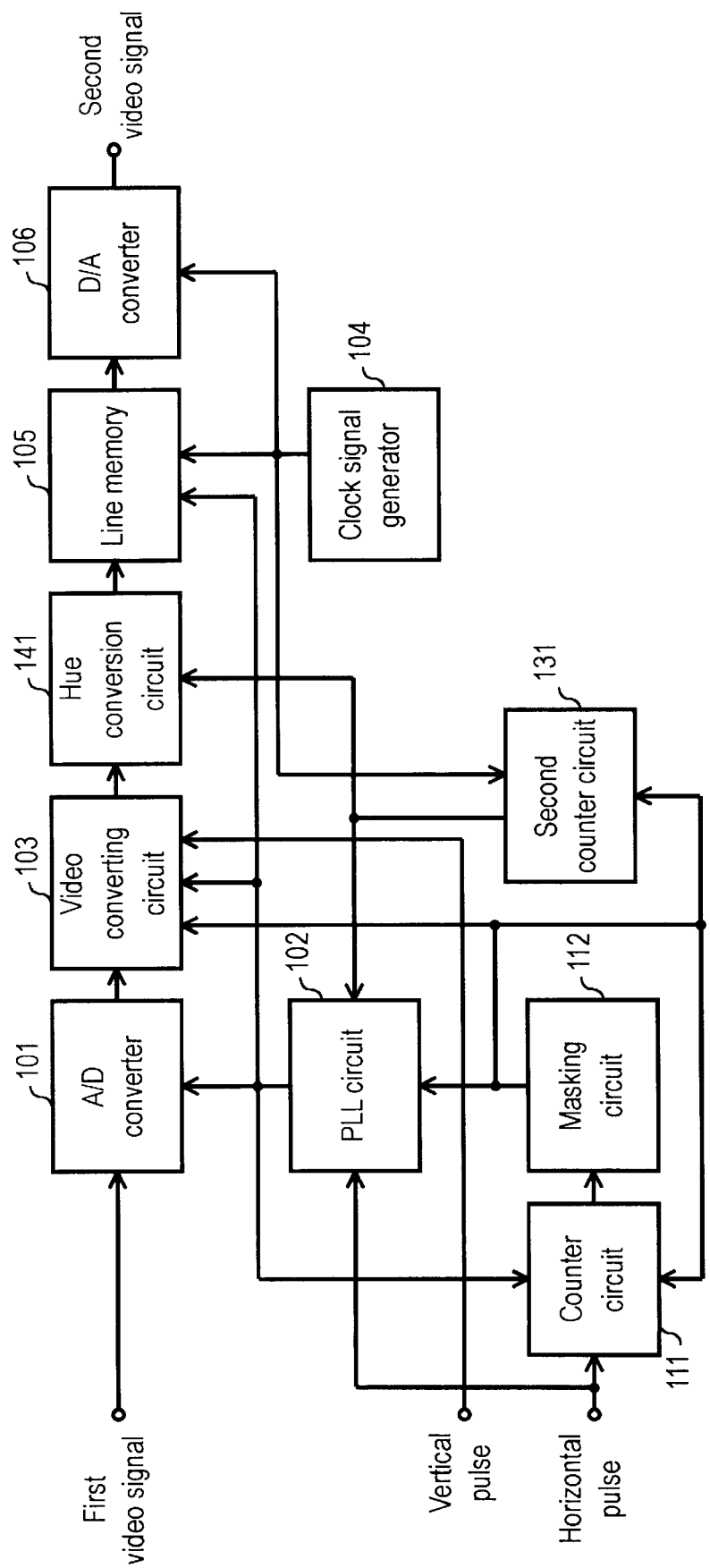
FIG. 9 is a block diagram depicting a video signal converter in accordance with a ninth exemplary embodiment of the present invention.

The ninth exemplary embodiment is described hereinafter by referring to FIG. 9, which differs from FIG. 8 in the following point: An operation of the hue conversion circuit 141 can be switched depending on the identification, which is outputted from a second counter circuit 131, about the horizontal frequency of the first video signal. The other elements are the same as shown in FIG. 8.

This circuitry allows the second counter circuit 131 to identify the horizontal frequency of the first video signal, thereby identifying a type of the first video signal. The hue conversion circuit 141 is switched responsive to a type of the first video signal, whereby the hue conversion can be appropriately controlled such as to determine a necessity of hue conversion and characteristics thereof. This is an advantage of this embodiment over the eighth exemplary embodiment.

(Embodiment 10)

Figure 10:
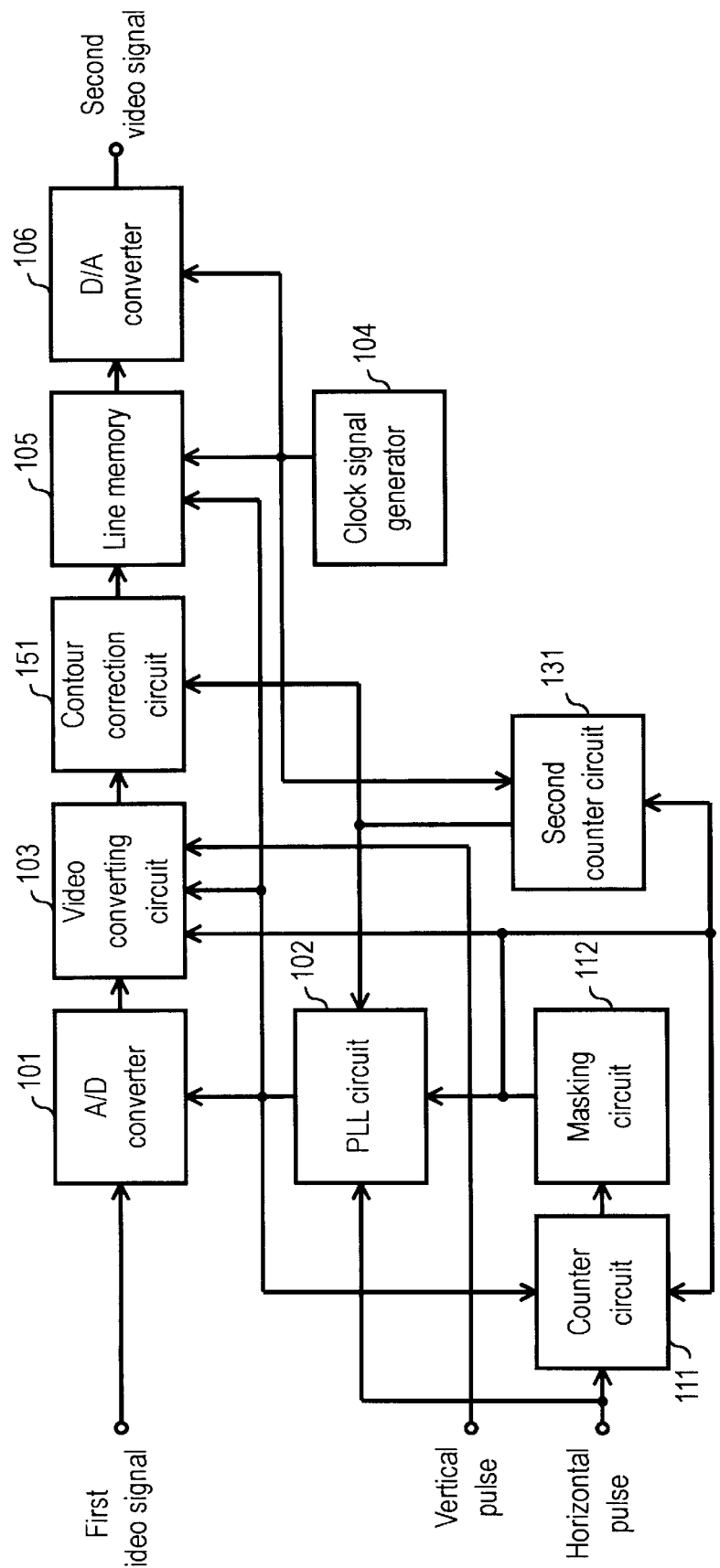
FIG. 10 is a block diagram depicting a video signal converter in accordance with a tenth exemplary embodiment of the present invention.

The tenth exemplary embodiment is described hereinafter by referring to FIG. 10, which differs from FIG. 7 in the following point: after converting a number of scanning lines in the video converting circuit 103, a contour correction circuit 151 corrects a contour in horizontal and vertical directions, and the characteristics of the contour correction circuit 151 is switched depending on the identification about the horizontal frequency of the first video signal. The other elements are the same as shown in FIG. 7.

This circuitry can control the characteristics of contour correction both in horizontal and vertical directions appropriately depending on a status or a type of the first video signal.

(Embodiment 11)

Figure 11:
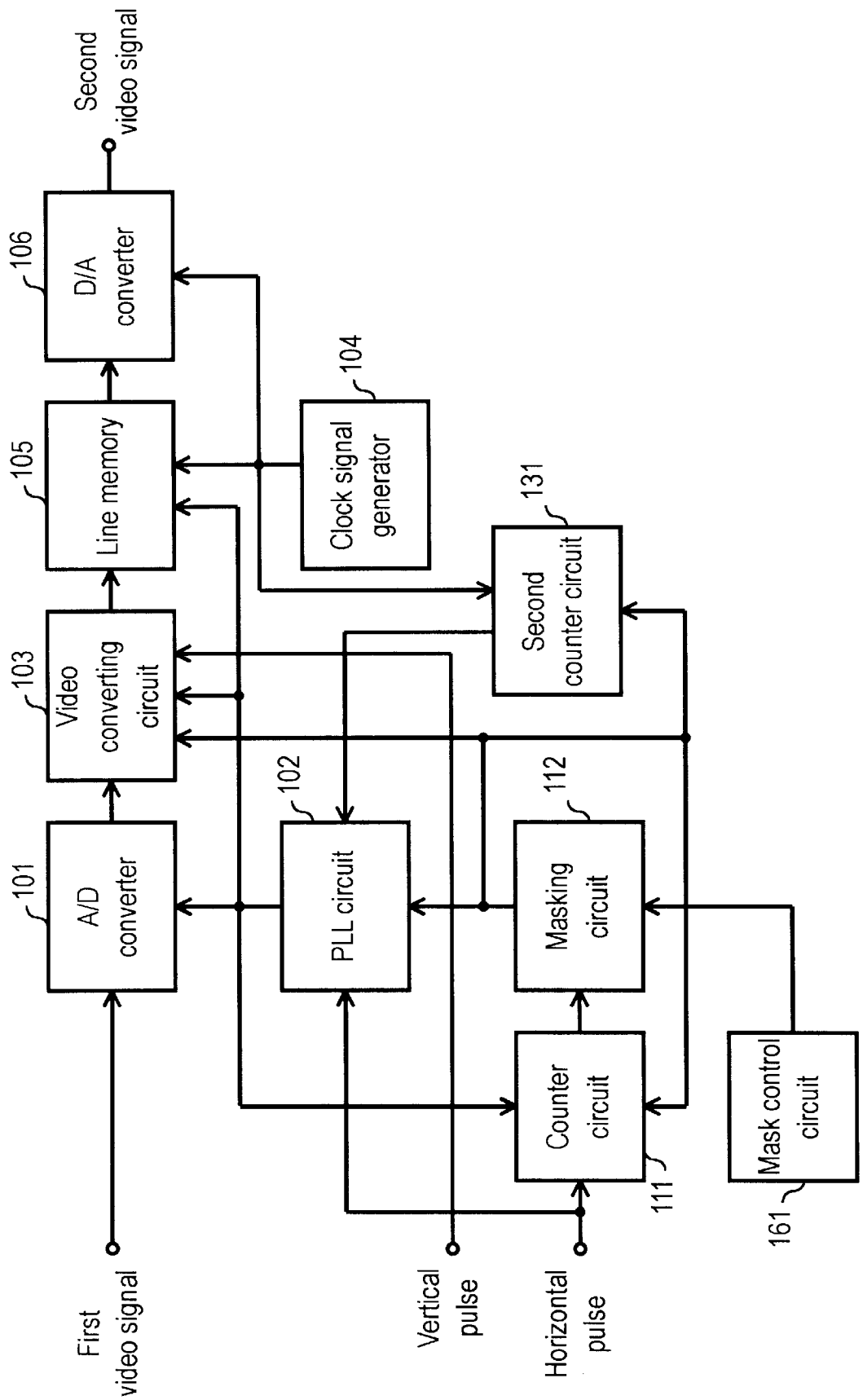
FIG. 11 is a block diagram depicting a video signal converter in accordance with an eleventh exemplary embodiment of the present invention.

The eleventh exemplary embodiment is described hereinafter by referring to FIG. 11, which differs from FIG. 7 in the following point: when a power supply of a video circuit (hereinafter called "system power supply") including the video signal converter is turned on, a mask control circuit 161 controls to stop the masking process in the masking circuit 112. The other elements are the same as shown in FIG. 7.

This circuitry enables the PLL circuit 102 to be locked in a desirable status by halting the mask processing by the mask control circuit 161 only when the system power supply is turned on, for the PLL circuit 102 is sometimes locked in a status other than the desirable status when the masking process is provided to the horizontal pulse since the system power supply has been turned on.

(Embodiment 12)

Figure 12:
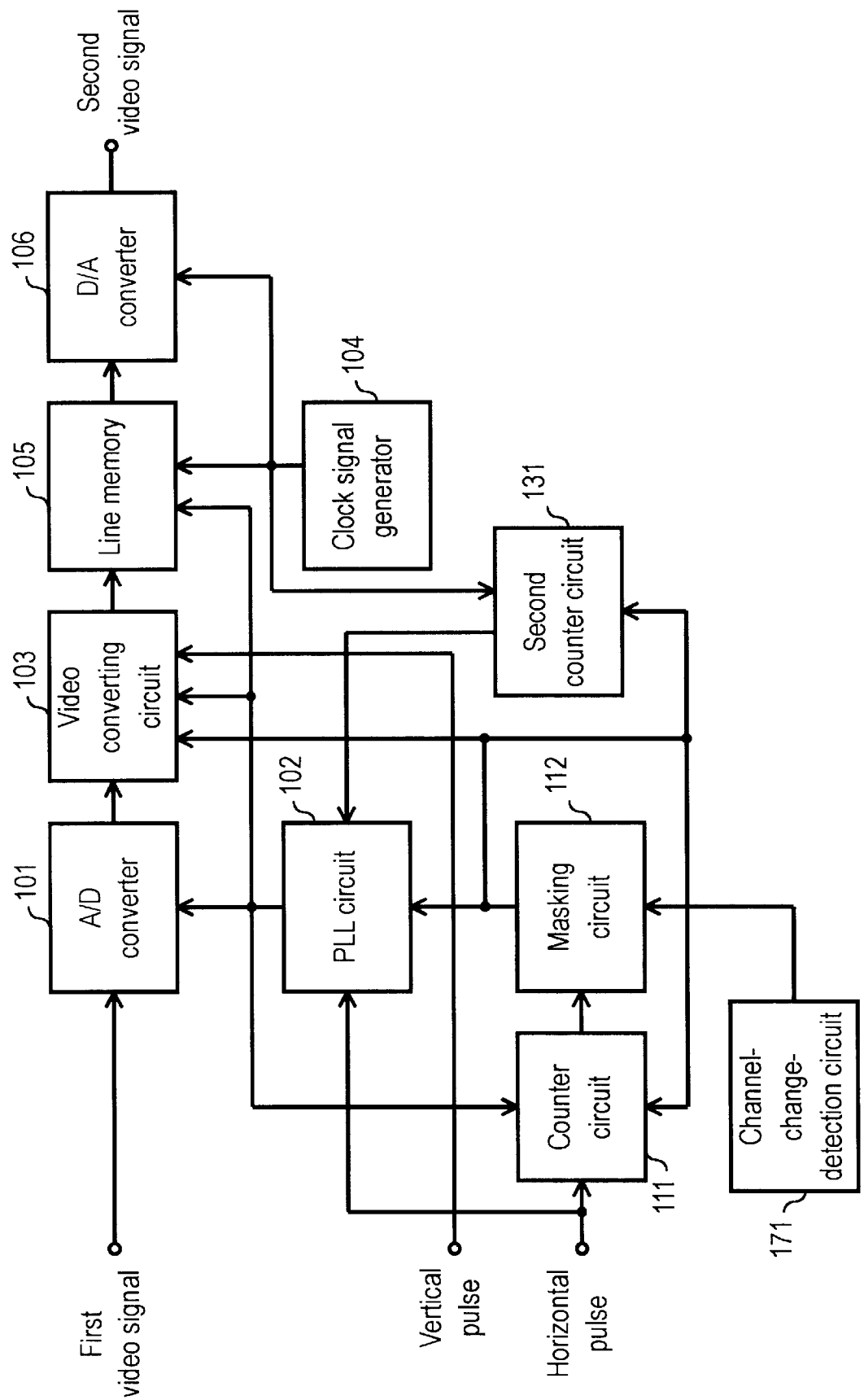
FIG. 12 is a block diagram depicting a video signal converter in accordance with a twelfth exemplary embodiment of the present invention.

The twelfth exemplary embodiment is described hereinafter by referring to FIG. 12, which differs from FIG. 7 in the following point: when a channel is changed during receiving a broadcasting, a channel change detection circuit 171 controls the masking process. The other elements are the same as shown in FIG. 7. This circuitry can control the masking process for the PLL circuit 102 to be correctly locked even if the horizontal frequency of the first video signal, which is inputted when a channel is changed, is varied.

(Embodiment 13)

Figure 13:
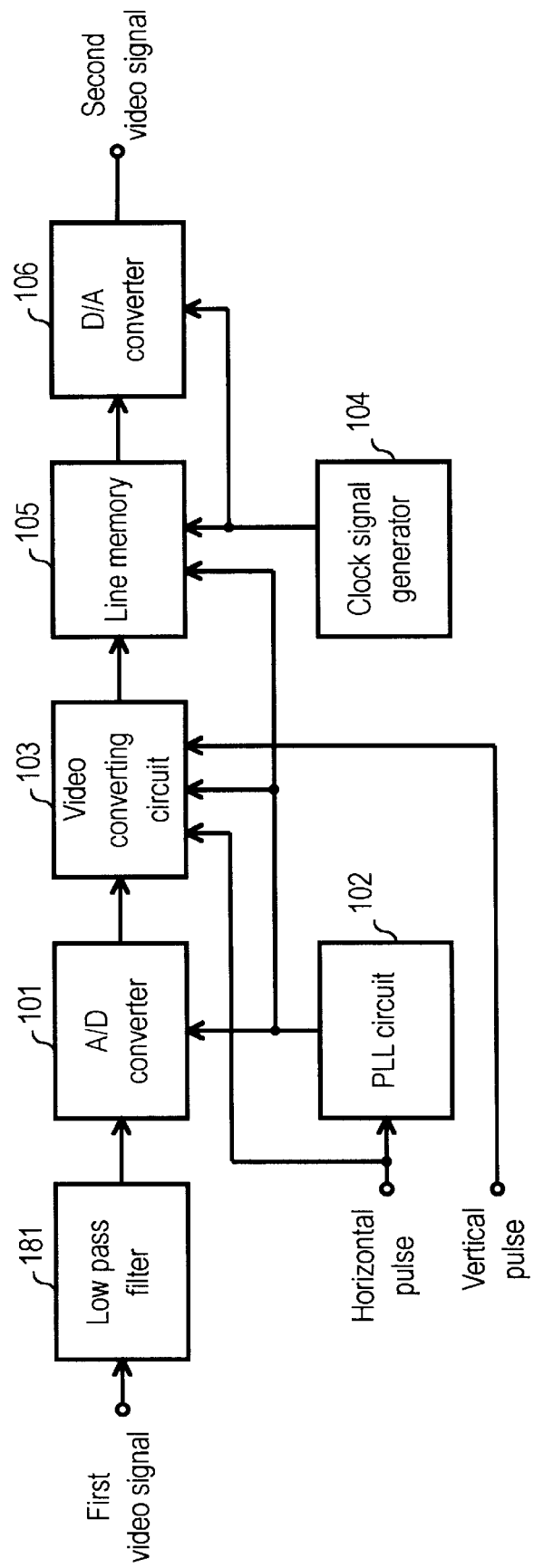
FIG. 13 is a block diagram depicting a video signal converter in accordance with a thirteenth exemplary embodiment of the present invention.

The thirteenth exemplary embodiment is described hereinafter by referring to FIG. 13, which differs from FIG. 1 in the following point: A low pass filter 181 is provided previous to the A/D converter 101. The A/D converter 101 removes a high frequency component of the first video signal lest a folding distortion should occur. The video converting circuit 103 converts a number of scanning lines of the video signal of which high frequency component has been removed. The other elements are the same as shown in FIG. 1.

This circuitry can prevent the first video signal from producing the unwelcome folding distortion.

(Embodiment 14)

Figure 14:
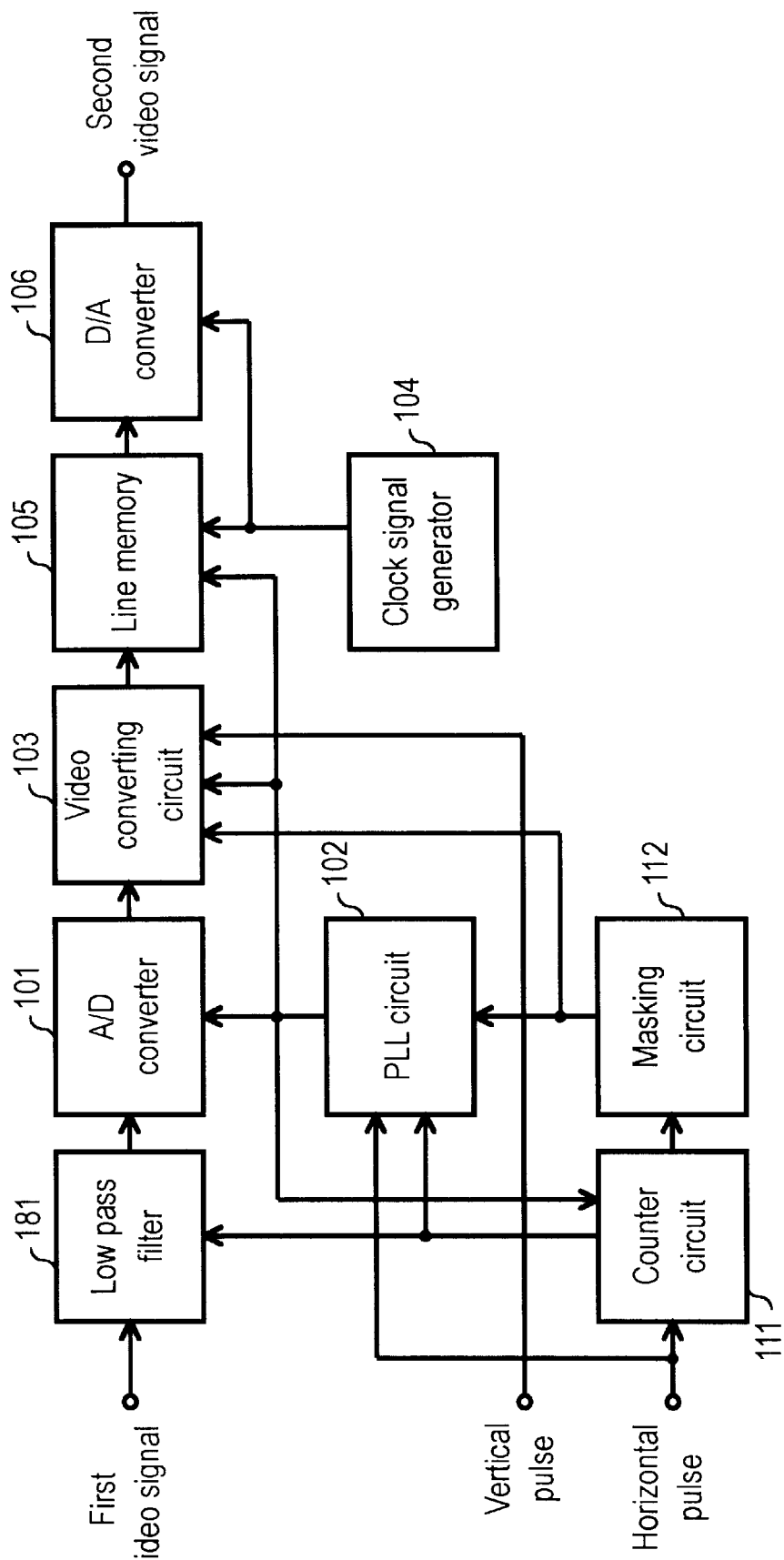
FIG. 14 is a block diagram depicting a video signal converter in accordance with a fourteenth exemplary embodiment of the present invention.

The fourteenth exemplary embodiment is described hereinafter by referring to FIG. 14, which differs from FIG. 5 in the following point: The low pass filter 181 removes the high frequency component from the first video signal before the signal undergoes the frequency conversion. Further, the characteristics of the low pass filter 181 can be controlled depending on the identification result of the horizontal frequency of the first video signal. The other elements are the same as shown in FIG. 5.

This circuitry can identify a horizontal frequency of the inputted video signal, and then identify a bandwidth of the inputted video signal based on the horizontal frequency identification, thereby adjusting the high frequency component appropriately to be removed by the low pass filter 181. As a result, video deterioration can be minimized. This is a different point from the thirteenth exemplary embodiment.

The above embodiments describe the NTSC signals, however, it should be apparent that the techniques described are equally applicable to other formats, such as PAL or SECAM.

What is claimed is:

1. A video signal converter for converting a number of scanning lines of a first input video signal into a different number of scanning lines of a second video signal, the video signal converter comprising:

(a) phase-locked-loop means which receives a horizontal pulse synchronized with said first input video signal, and generates a first clock signal synchronized with the horizontal pulse, (b) an Analog-to-Digital converter which converts said first input video signal using said first clock signal, (c) video converting means which receives (1) a first digital video signal tapped off from said Analog-to-Digital converter, (2) said first clock signal, (3) said horizontal pulse and (4) a vertical pulse synchronized with said first video signal, and converts a number of scanning lines of said first digital video signal into a number of scanning lines of a second digital video signal, (d) a clock signal generator which outputs a second clock signal independent of said first clock signal, (e) a memory which stores said second digital video signal tapped off from said video converting means by using said first clock signal from said phase-locked-loop means, and reads out said second digital video signal by using said second clock signal from said clock signal generator before outputting a third digital video signal, and (f) a Digital-to-Analog converter which converts, the third digital video signal tapped off from the memory into analog format from digital format, whereby said number of scanning lines of the inputted first video signal is converted, and then the second video signal having converted scanning lines is outputted, and said phase-locked-loop means generates the first clock signal so that a number of effective horizontal pixels of the inputted first video signal equals that of the outputted second video signal.

2. A video signal converter for converting a number of scanning lines of a first input video signal into a different number of scanning lines of a second video signal, the video signal converter comprising:

(a) phase-locked-loop means which receives a horizontal pulse synchronized with said first input video signal, and generates a first clock signal synchronized with the horizontal pulse, (b) an Analog-to-Digital converter which converts said first input video signal using said first clock signal, (c) video converting means which receives (1) a first digital video signal tapped off from said Analog-to- Digital converter, (2) said first clock signal, (3) said horizontal pulse and (4) a vertical pulse synchronized with said first video signal, and converts a number of scanning lines of said first digital video signal into a number of scanning lines of a second digital video signal, (d) a clock signal generator which outputs a second clock signal independent of said first clock signal, (e) a memory which stores said second digital video signal tapped off from said video converting means by using said first clock signal from said phase-locked-loop means, and reads out said second digital video signal by using said second clock signal from said clock signal generator before outputting a third digital video signal, (f) a Digital-to-Analog converter which converts, the third digital video signal tapped off from the memory into analog format from digital format, (g) counter means which is triggered by the first clock signal and synchronized with the inputted horizontal pulse, and (h) masking means which provides a masking process to an interval of said horizontal pulse by using said counter means, whereby said number of scanning lines of the inputted first video signal is converted, and then the second video signal having converted scanning lines is outputted.

3. The video signal converter as defined in claim 2, further comprising mask position determination means for determining a starting position of masking by referring to a position of the horizontal pulse.

4. The video signal converter as defined in claim 2, wherein said counter means, which is triggered by the first clock signal, counts a horizontal frequency, and identifies the horizontal frequency of the first video signal by comparing a predetermined threshold frequency with the counted frequency, thereby controlling said phase-locked-loop means.

5. The video signal converter as defined in claim 2, wherein said counter means, which is triggered by the first clock signal and synchronized with a second horizontal pulse undergone the masking process, counts a horizontal frequency, and identifies a horizontal frequency of the first video signal by comparing a predetermined threshold frequency with the counted frequency, thereby controlling said phase-locked-loop means.

6. The video signal converter as defined in claim 2, further comprising second counter means, which is triggered by the second clock signal and synchronized with a second horizontal pulse undergone the masking process, counts a horizontal frequency, and identifies a horizontal frequency of the first video signal by comparing a predetermined threshold frequency with the counted frequency, thereby controlling said phase-locked-loop means.

7. The video signal converter as defined in claim 6, further comprising hue conversion means for converting a hue of an image corresponding to said first input video signal, wherein, said hue is converted in step with a conversion of the first video signal into the second video signal.

8. The video signal converter as defined in claim 7, wherein said hue conversion means is appropriately switched responsive to the identification of the horizontal frequency of the horizontal pulse.

9. The video signal converter as defined in claim 6, further comprising contour correction means which switches contour correction of an image corresponding to said first input video signal along at least one of a horizontal direction and a vertical direction responsive to the identification of the horizontal frequency of the horizontal pulse.

10. The video signal converter as defined in claim 6, further comprising mask control means which disables the masking process to the horizontal pulse responsive to a power supply being activated.

11. The video signal converter as defined in claim 6, further comprising channel-change-detection-means which disables the masking process to the horizontal pulse responsive to a channel being changed during receiving of broadcasting.

12. A video signal converter for converting a number of scanning lines of a first input video signal into a different number of scanning lines of a second video signal, the video signal converter comprising:

(a) phase-locked-loop means which receives a horizontal pulse synchronized with said first input video signal, and generates a first clock signal synchronized with the horizontal pulse, (b) an Analog-to-Digital converter which converts said first input video signal using said first clock signal, (c) video converting means which receives (1) a first digital video signal tapped off from said Analog-to-Digital converter, (2) said first clock signal, (3) said horizontal pulse and (4) a vertical pulse synchronized with said first video signal, and converts a number of scanning lines of said first digital video signal into a number of scanning lines of a second digital video signal, (d) a clock signal generator which outputs a second clock signal independent of said first clock signal, (e) a memory which stores said second digital video signal tapped off from said video converting means by using said first clock signal from said phase-locked-loop means, and reads out said second digital video signal by using said second clock signal from said clock signal generator before outputting a third digital video signal, and (f) a Digital-to-Analog converter which converts, the third digital video signal tapped off from the memory into analog format from digital format, whereby said number of scanning lines of the inputted first video signal is converted, and then the second video signal having a converted scanning lines is outputted, and the first video signal is fed into the Analog-to-Digital converter through a low pass filter.

13. The video signal converter as defined in claim 4, wherein the first video signal is fed into the Analog-to-Digital converter through a low pass filter, while a characteristic of said low pass filter is controlled by a counting result of the horizontal frequency of the first video signal.

* * * * *